(12) United States Patent
Yamamoto

(10) Patent No.: US 12,546,891 B2
(45) Date of Patent: Feb. 10, 2026

(54) ELECTRONIC DEVICE

(71) Applicant: CANON KABUSHIKI KAISHA, Tokyo (JP)

(72) Inventor: Hideaki Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 806 days.

(21) Appl. No.: 17/954,470

(22) Filed: Sep. 28, 2022

(65) Prior Publication Data
US 2023/0013134 A1 Jan. 19, 2023

Related U.S. Application Data

(63) Continuation of application No. PCT/JP2021/002814, filed on Jan. 27, 2021.

(30) Foreign Application Priority Data

Apr. 14, 2020 (JP) ................................ 2020-072186

(51) Int. Cl.
G01S 17/08 (2006.01)
G06F 3/01 (2006.01)
H04N 23/53 (2023.01)
H04N 23/56 (2023.01)

(52) U.S. Cl.
CPC .............. *G01S 17/08* (2013.01); *G06F 3/013* (2013.01); *H04N 23/53* (2023.01); *H04N 23/56* (2023.01)

(58) Field of Classification Search
None
See application file for complete search history.

(56) References Cited

FOREIGN PATENT DOCUMENTS

| CN | 105917292 A | 8/2016 | |
|---|---|---|---|
| JP | 05-257059 A | 10/1993 | |
| JP | 07199047 A * | 8/1995 | ............... G02B 7/11 |
| JP | 09-253050 A | 9/1997 | |
| JP | 09-262209 A | 10/1997 | |
| JP | 2004-012503 A | 1/2004 | |
| JP | 2004-215062 A | 7/2004 | |

OTHER PUBLICATIONS

Jan. 30, 2024 Japanese Office Action, which is enclosed without an English Translation, that issued in Japanese Patent Application No. 2020-072186.

(Continued)

*Primary Examiner* — Luke D Ratcliffe
(74) *Attorney, Agent, or Firm* — Cowan, Liebowitz & Latman, P.C.

(57) ABSTRACT

An electronic device according to the present invention is an electronic device which is capable of performing eye proximity sensing to sense contact of an eye with an eyepiece and line of sight detection to detect a line of sight, including: an eye proximity sensing sensor configured to receive light for the eye proximity sensing; a line of sight detection sensor configured to receive light for the line of sight detection, the line of sight detection sensor being separate from the eye proximity sensing sensor; and one or more light sources including a light source used for both the eye proximity sensing and the line of sight detection.

5 Claims, 9 Drawing Sheets

(56) References Cited

OTHER PUBLICATIONS

The above foreign patent document was cited in the May 22, 2024 Chinese Office Action, which is enclosed with an English Translation, that issued in Chinese Patent Application No. 202180028226.0.

Jul. 16, 2024 Japanese Office Action, which is enclosed without an English Translation, that issued in Japanese Patent Application No. 2020-072186.

All the above references were cited in the International Search Report dated Apr. 20, 2021 of the corresponding International Application, PCT/JP2021/002814 dated Jan. 27, 2012.

* cited by examiner

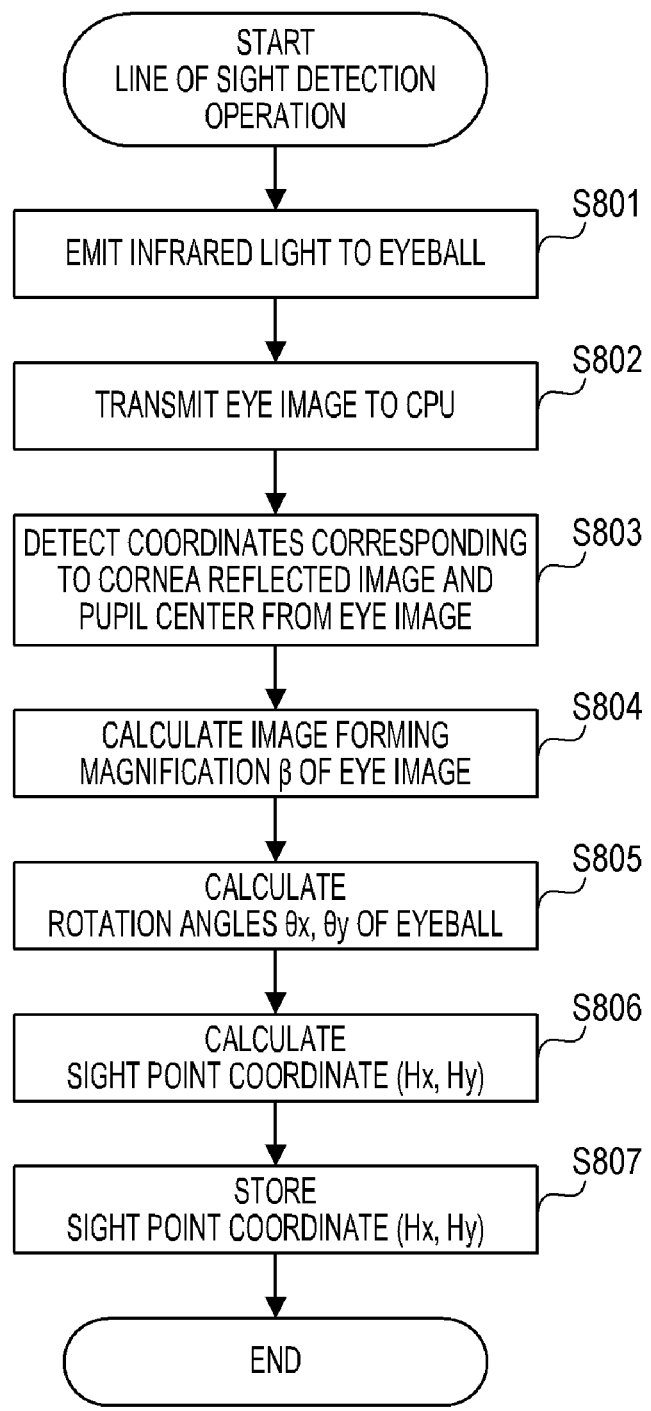

ELECTRONIC DEVICE

CROSS-REFERENCE TO RELATED APPLICATIONS

This application is a Continuation of International Patent Application No. PCT/JP2021/002814, filed Jan. 27, 2021, which claims the benefit of Japanese Patent Application No. 2020-072186, filed Apr. 14, 2020, which is hereby incorporated by reference herein in its entirety.

BACKGROUND OF THE INVENTION

Field of the Invention

The present invention relates to electronic device having a line of sight detection function.

Background Art

A camera (including a video camera) capable of detecting a line of sight (line of sight direction) of a user by the line of sight detection function and performing selection of a distance measuring point or the like on the basis of a detection result of the line of sight has been put into practice. Moreover, a camera having an eye proximity sensing function so that the line of sight detection function is enabled only when the user contacts his/her eye with a finder (eyepiece) has also been put into practice.

Patent Literature 1 discloses an art which realizes the line of sight detection function and the eye proximity sensing function by providing a light-emitting diode for the eye proximity sensing and an eye proximity sensing sensor separately from a light-emitting diode for the line of sight detection and the line of sight detection sensor. Patent Literature 2 discloses an art for performing the line of sight detection and the eye proximity sensing with the same sensor.

However, with the prior art disclosed in Patent Literature 1, since a member for the line of sight detection and a member for the eye proximity sensing are provided separately, constitution becomes complicated, and costs rise. With the prior art disclosed in Patent Literature 2, since the line of sight detection and the eye proximity sensing are performed by the same sensor, power consumption of the eye proximity sensing increases.

The present invention provides an electronic device which realizes the eye proximity sensing function and the line of sight detection function with small power consumption and with a low cost.

CITATION LIST

Patent Literature

PTL 1 Japanese Patent Application Publication No. H07-199047
PTL 2 Japanese Patent Application Publication No. H09-262209

SUMMARY OF THE INVENTION

An electronic device according to the present invention is an electronic device which is capable of performing eye proximity sensing to sense contact of an eye with an eyepiece and line of sight detection to detect a line of sight, including: an eye proximity sensing sensor configured to receive light for the eye proximity sensing; a line of sight detection sensor configured to receive light for the line of sight detection, the line of sight detection sensor being separate from the eye proximity sensing sensor; and one or more light sources including a light source used for both the eye proximity sensing and the line of sight detection.

Further features of the present invention will become apparent from the following description of exemplary embodiments with reference to the attached drawings.

BRIEF DESCRIPTION OF THE DRAWINGS

FIG. 8 is a flowchart of a sight-line detection operation according to this embodiment.

DESCRIPTION OF THE EMBODIMENTS

Figure 1A:
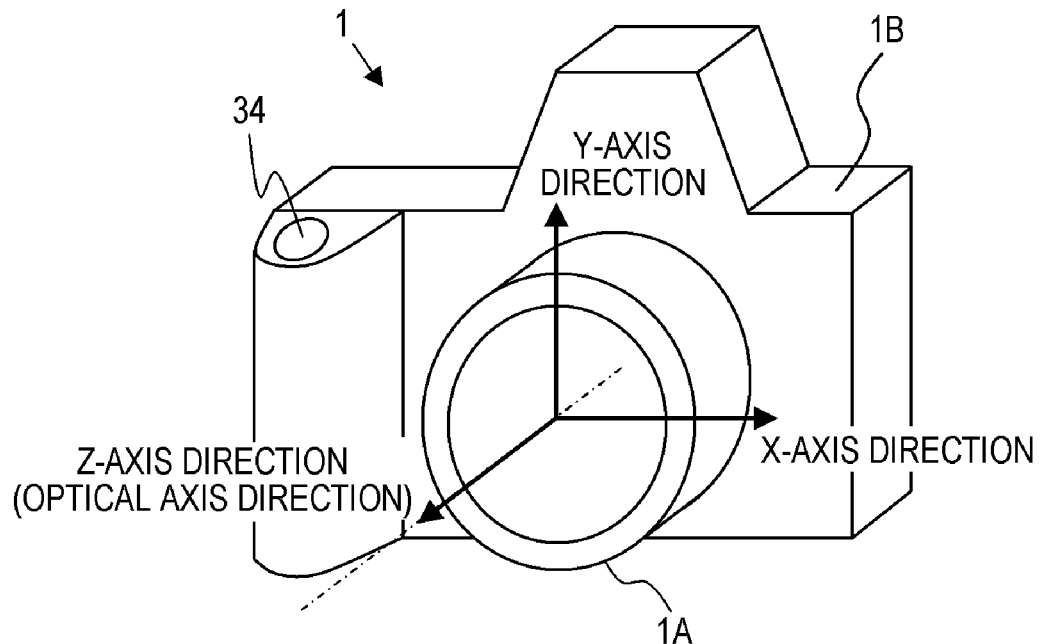
FIGS. 1A and 1B are appearance views of a camera according to this embodiment.
Figure 1B:
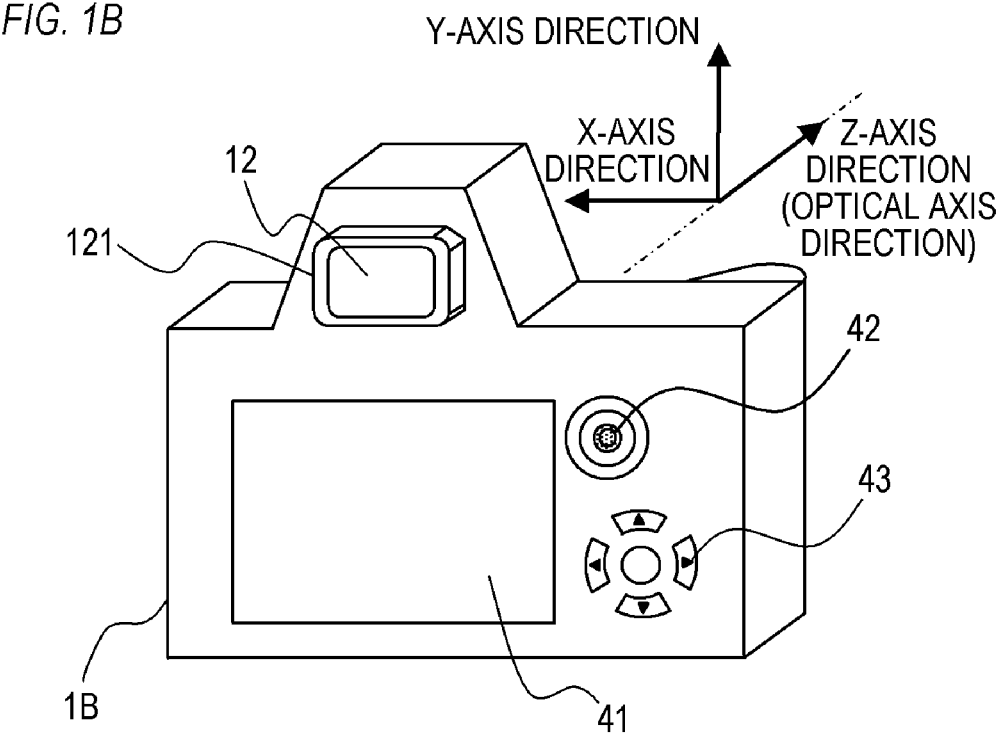

Hereinafter, a preferred embodiment of the present invention will be described by referring to the attached drawings.
<Explanation of Configuration>
FIGS. 1A and 1B illustrate an appearance of a camera 1 (digital still camera; lens-replacement type camera) according to this embodiment. The present invention can be applied also to a device which displays information such as images, characters and the like and arbitrary electronic devices capable of detecting a line of sight of a user who visually recognizes an optical image through an ocular optical system. These electronic devices may include mobile phones, game machines, tablet terminals, personal computers, watch-type or spectacle-type information terminals, head-mount displays, binoculars and the like, for example.

FIG. 1A is a front perspective view, and FIG. 1B is a rear perspective view. As shown in FIG. 1A, the camera 1 has a photographing lens unit 1A and a camera casing 1B. In the camera casing 1B, a release button 34 which is an operating member for accepting a photographing operation from the user (photographer) is disposed. As shown in FIG. 1B, on a rear surface of the camera casing 1B, a window frame 121 for the user to look into a display panel 6, which will be described later, included in the camera casing 1B is disposed. The window frame 121 forms an eye hole 12 and protrudes to an outer side (rear surface side) with respect to the camera casing 1B. On the rear surface of the camera casing 1B, operating members 41 to 43 which accept various operations from the user are also disposed. For example, the operating member 41 is a touch panel which accepts a touch operation, the operating member 42 is an operation lever which can be pushed down in each direction, and the operating member 43 is a four-way key capable of being pushed in each of four directions. The operating member 41 (touch panel) includes a display panel such as a liquid crystal panel or the like and has a function of displaying images on the display panel.

Figure 2:
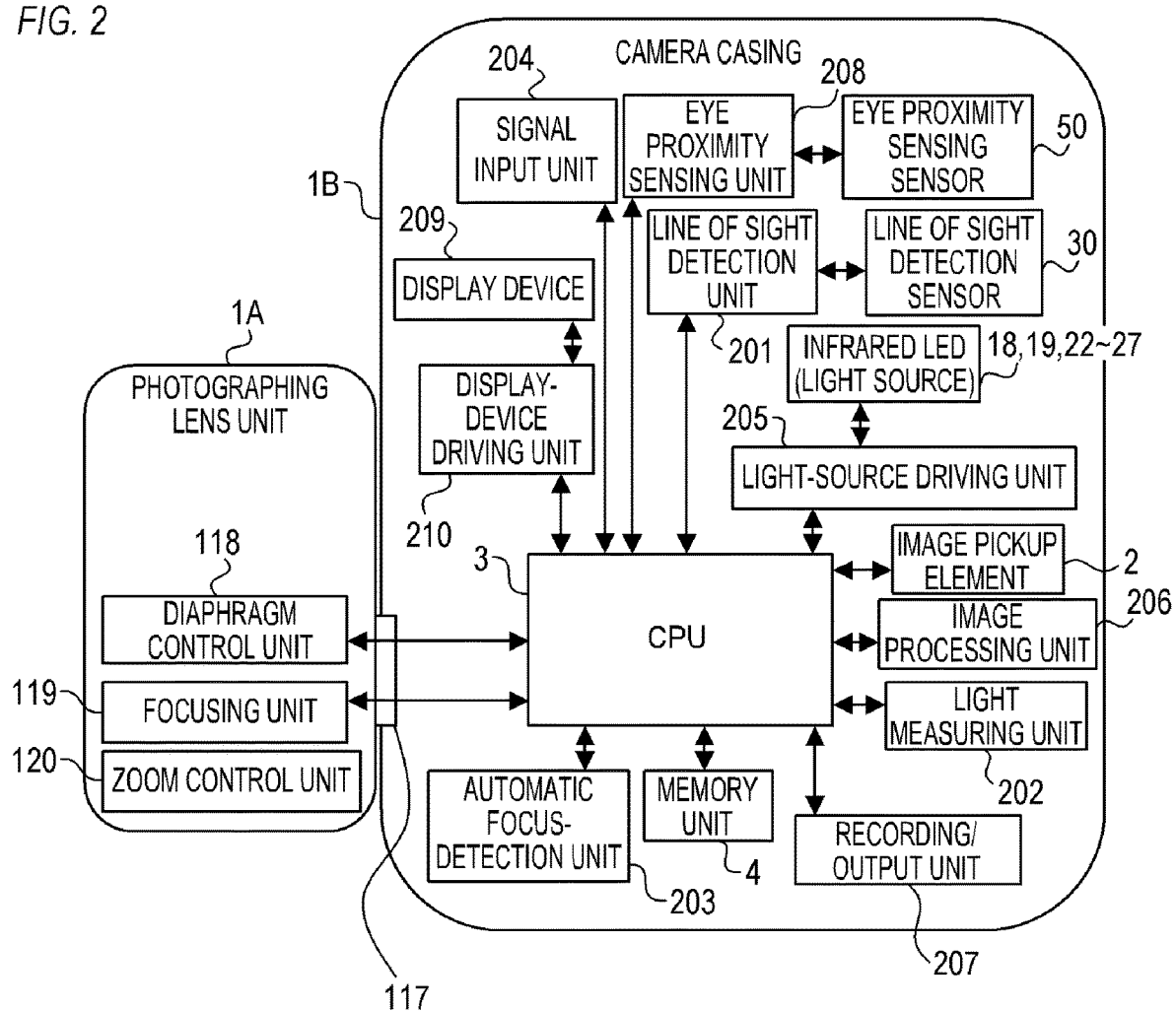
FIG. 2 is a block diagram of the camera according to this embodiment.

FIG. 2 is a block diagram illustrating a configuration inside the camera 1.

An image pickup element 2 is an image pickup element such as a CCD, a CMOS sensor or the like, for example, and photoelectrically converts an optical image formed on an image pickup surface of the image pickup element 2 by an optical system of the photographing lens unit 1A and outputs an obtained analog image signal to an A/D conversion unit (not shown). The A/D conversion unit A/D converts the analog image signal obtained by the image pickup element 2 and outputs it as image data.

The photographing lens unit 1A is constituted by an optical system including a zoom lens, a focus lens, a diaphragm and the like and, in a state attached to the camera casing 1B, guides the light from an object to the image pickup element 2 and forms an image of the object on the image pickup surface of the image pickup element 2. A diaphragm control unit 118, a focusing unit 119, and a zoom control unit 120 receive instruction signals from a CPU 3 through a mount contact 117, respectively, and controls drive of the diaphragm, the focus lens, and the zoom lens by following the instruction signals.

The CPU 3 included in the camera casing 1B reads out a control program for each block included in the camera casing 1B from a ROM provided in a memory unit 4, expands it in a RAM provided in the memory unit 4 and executes it. As a result, the CPU 3 controls an operation of each block provided in the camera casing 1B. To the CPU 3, a line of sight detection unit 201, a light measuring unit 202, an automatic focus-detection unit 203, a signal input unit 204, an eye proximity sensing unit 208, a display-device driving unit 210, a light-source driving unit 205 and the like are connected. Moreover, the CPU 3 transmits a signal through the diaphragm control unit 118, the focusing unit 119, and the zoom control unit 120 disposed in the photographing lens unit 1A through the mount contact 117. In this embodiment, the memory unit 4 includes a storage function of image pickup signals from the image pickup element 2 and a line of sight detection sensor 30.

The line of sight detection unit 201 A/D converts an output (eye image obtained by photographing an eye) of the line of sight detection sensor 30 in a state where an eyeball image is formed on the line of sight detection sensor 30 and transmits the result to the CPU 3. The CPU 3 extracts feature points required for line of sight detection from the eye image in accordance with a predetermined algorithm, which will be described later, and calculates a line of sight (sight point in an image for visual recognition) of the user from a position of a feature point.

The eye proximity sensing unit 208 transmits an output of an eye proximity sensing sensor 50 to the CPU 3. The CPU 3 calculates whether the user contacts the eye with an eyepiece (finder: portion of an eye hole 12) or not in accordance with a predetermined algorithm, which will be described later.

The light measuring unit 202 performs amplification, logarithmic compression, A/D conversion and the like of a signal obtained from the image pickup element 2 which also serves as a light measuring sensor, or more specifically, a brightness signal corresponding to brightness of an object field and sends the result as object field brightness information to the CPU 3.

The automatic focus-detection unit 203 A/D converts a signal voltage from a plurality of detection elements (a plurality of pixels) included in the image pickup element 2 (a CCD, for example) and used for phase-difference detection and sends it to the CPU 3. The CPU 3 calculates a distance to the object corresponding to each of the focus detection points from the signals of the plurality of detection elements. This is a publicly known art, which is known as an image-pickup plane phase-difference AF. In this embodiment, as an example, it is supposed that a view-field image (image for visual recognition) in the finder is divided, and there is a focus detection point in each of the 180 divided spots on the image pickup plane.

The light-source driving unit 205 drives infrared LEDs 18, 19, 22 to 27, which will be described later, on the basis of a signal (instruction) from the CPU 3. Specifically, the light-source driving unit 205 individually or collectively controls light-emission intensities (light emission amounts: light emission brightness) of the infrared LEDs 18, 19, 22 to 27 on the basis of the signal from the CPU 3. The control of the light-emission intensity is supposed to include switching of turning on/off.

An image processing unit 206 executes various types of image processing for the image data stored in the RAM. For example, various types of the image processing are executed for developing and displaying/recording digital image data such as correction processing of pixel defects caused by the optical system and the image pickup element, demosaicing processing, white-balance correction processing, color interpolation processing, gamma processing and the like.

To the signal input unit 204, a switch SW1 and a switch SW2 are connected. The switch SW1 is a switch for starting light measurement, distance measurement, line of sight detection operations and the like of the camera 1 and is turned ON by a first stroke of the release button 34. The switch SW2 is a switch for starting a photographing operation and is turned on by a second stroke of the release button 34. ON signals from the switches SW1 and SW2 are input into the signal input unit 204 and are transmitted to the CPU 3. Moreover, the signal input unit 204 also accepts operation inputs from the operating member 41 (touch panel), the operating member 42 (operation lever), and the operating member 43 (four-way key) in FIG. 1B.

A recording/output unit 207 records data including image data in a recording medium such as a detachable memory card and the like or outputs these types of data to an external device through an external interface.

The display-device driving unit 210 drives a display device 209 on the basis of the signal from the CPU 3. The display device 209 is display panels 5, 6, which will be described later.

Figure 3:
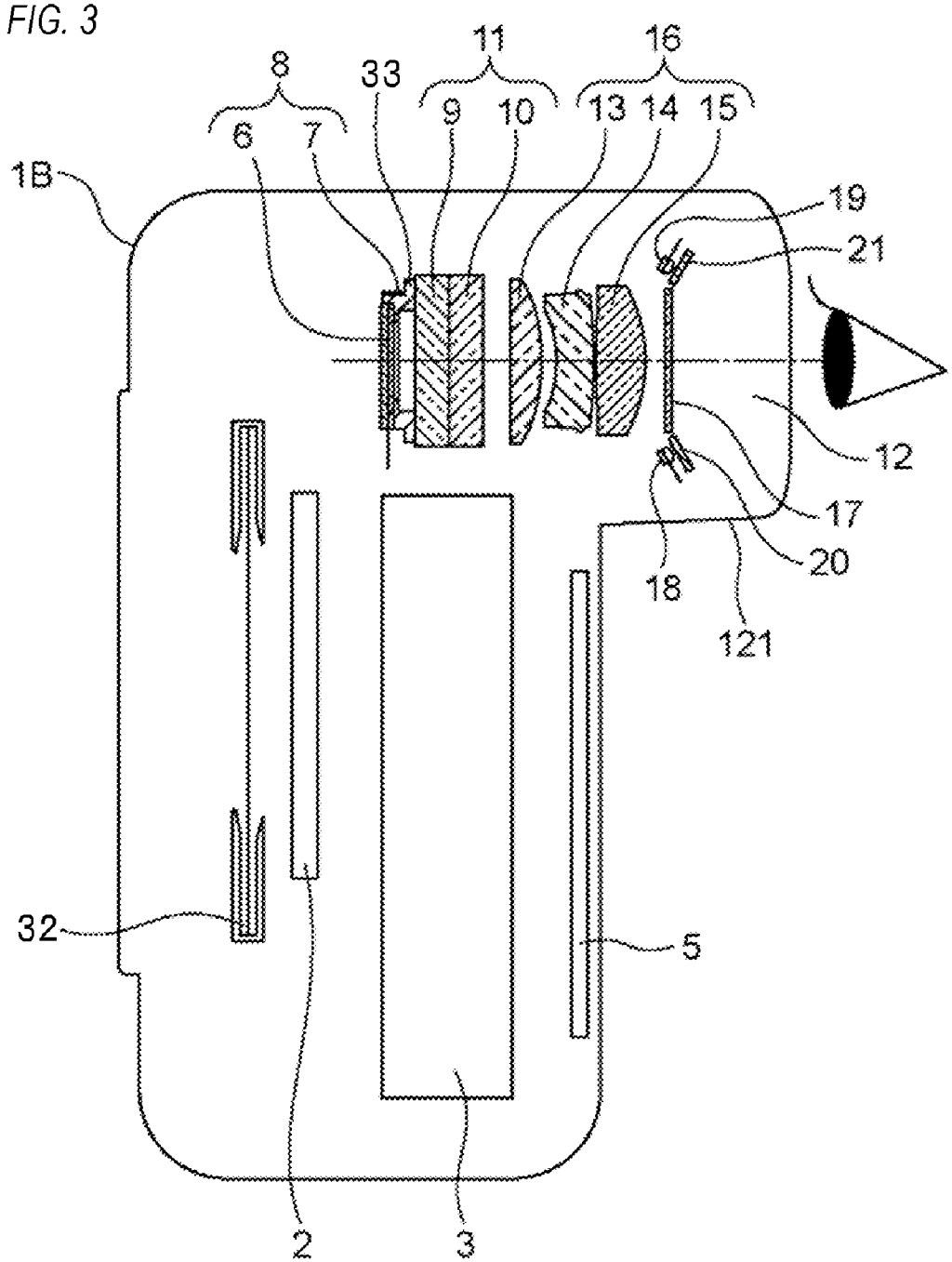
FIG. 3 is a sectional view of the camera according to this embodiment.

FIG. 3 is a sectional view obtained by cutting the camera 1 on a YZ plane formed by a Y-axis and a Z-axis shown in FIGS. 1A and 1s a view conceptually illustrating a configuration of the camera 1.

A shutter 32 and the image pickup element 2 are aligned in order in an optical axis direction of a photographing lens unit 1A.

The display panel 5 is provided on the rear surface of the camera casing 1B, and the display panel 5 performs operations of the camera 1 and menu display and image display for appreciation/edition of the image obtained by the camera 1. The display panel 5 is constituted by a liquid crystal panel with a backlight, an organic EL panel or the like.

The EVF provided on the camera casing 1B is configured, in addition to display of the menu or the image as in the display panel 5 as a normal EVF, capable of detection of a line of sight of the user looking into the EVF and reflection of the detection result in the control of the camera 1.

The display panel 6 performs display similar to the display panel 5 (operations of the camera 1 and the menu display and the image display for appreciation/edition of the image obtained by the camera 1) when the user is looking into the finder. The display panel 6 is constituted by a liquid crystal panel with a backlight, an organic EL panel or the like. The display panel 6 is constituted by a rectangle with a size in an X-axis direction (horizontal direction) longer than a Y-axis direction (perpendicular direction) such as 3:2, 4:3 or 16:9 similarly to the photographed image in a normal camera.

A panel holder 7 is a panel holder which holds the display panel 6, and the display panel 6 and the panel holder 7 are bonded/fixed and constitute a display panel unit 8.

A first optical-path division prism 9, a second optical-path division prism 10 are bonded and constitute an optical-path division prism unit 11 (optical-path dividing member). The optical-path division prism unit 11 leads light from the display panel 6 to an eyepiece window 17 provided at the eye hole 12 and to the contrary, leads reflected light from an eye (pupil) led from the eyepiece window 17 and the like to the line of sight detection sensor 30.

The display panel unit 8 and the optical-path division prism unit 11 are fixed with a mask 33 between them and integrally formed.

An ocular optical system 16 is constituted by a G1 lens 13, a G2 lens 14, and a G3 lens 15.

The eyepiece window 17 is a transparent member which transmits visible light. An image displayed on the display panel unit 8 is observed through the optical-path division prism unit 11, the ocular optical system 16, and the eyepiece window 17.

Illumination windows 20, 21 are windows for concealing the infrared LEDs 18, 19, 22 to 27 so that they cannot be visually recognized from outside and are constituted by a resin which absorbs the visible light and transmits the infrared light.

Figure 4A:
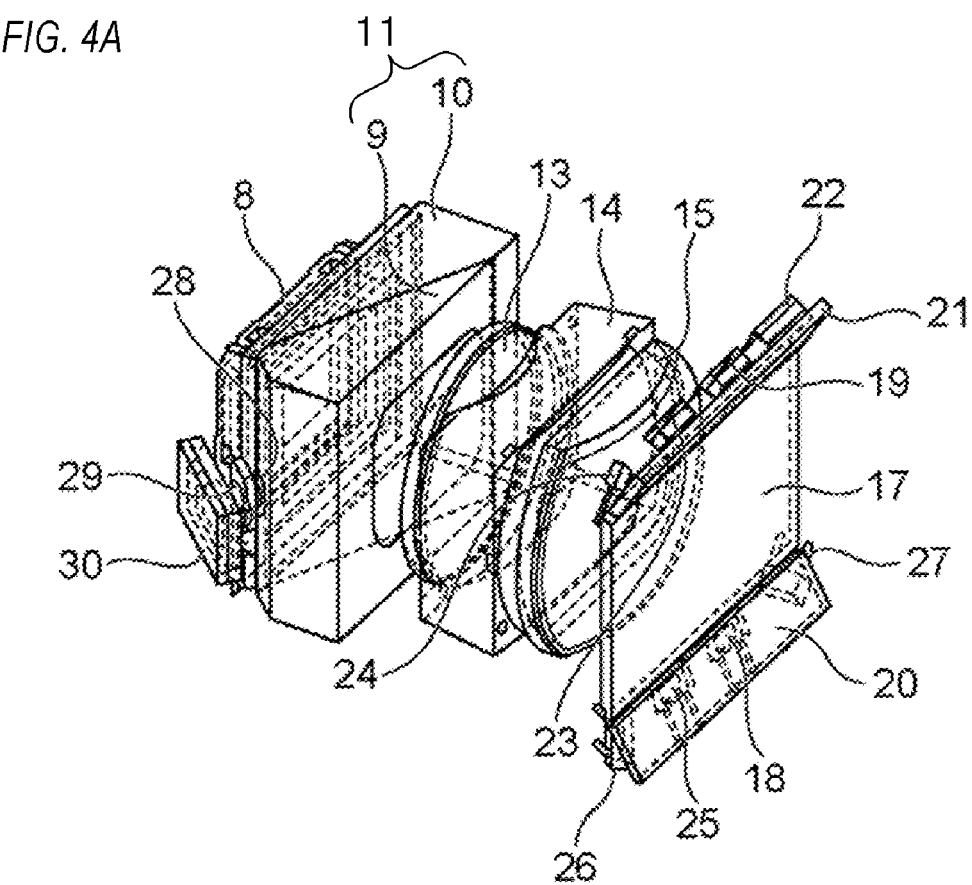
FIGS. 4A and 4B are diagrams illustrating an EVF part of the camera according to this embodiment.
Figure 4B:
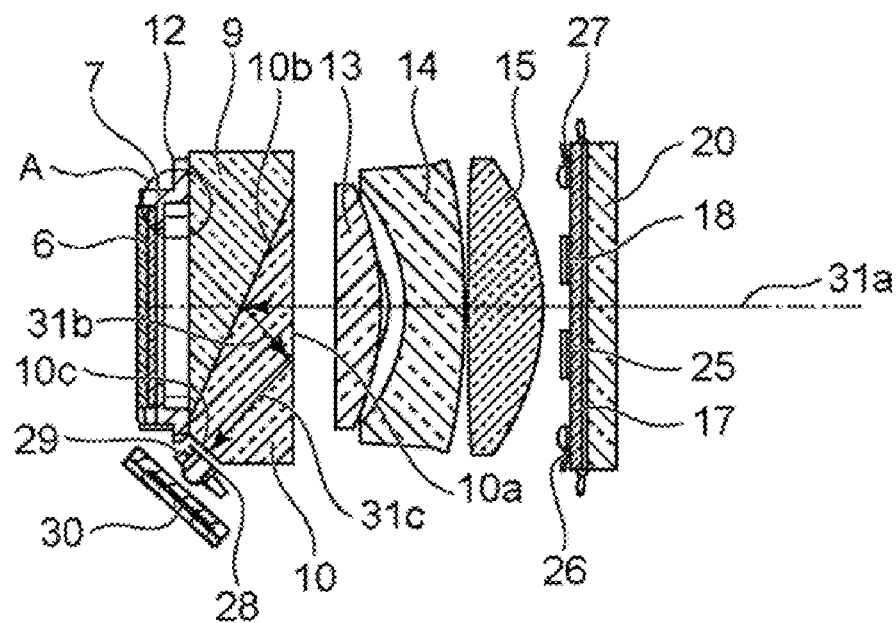

FIG. 4A is a perspective view illustrating a configuration of the EVF part of the camera 1, and FIG. 4B is a lateral sectional view of an optical axis of the EVF part.

The infrared LEDs 18, 19, 22, 23, 24, 25, 26, 27 are disposed with positions/attitudes different from one another so that each emits the infrared light toward the eye hole 12. The infrared LEDs 18, 19, 23, 25 are infrared LEDs (light sources) for close-range illumination. The infrared LEDs 22, 24, 26, 27 are infrared LEDs (light sources) for long-range illumination. A light source other than the infrared LED may be used.

A line of sight detection optical system including a diaphragm 28 and a line of sight image forming lens 29 leads infrared reflected light led by the optical-path division prism unit 11 from the eyepiece window 17 to the line of sight detection sensor 30.

The line of sight detection sensor 30 is constituted by solid image pickup elements such as a CCD, a CMOS and the like. The infrared LEDs 18, 19, 22 to 27 emit light to the eyeball of the user, and the line of sight detection sensor 30 receives the reflected light (reflected light emitted from the infrared LEDs 18, 19, 22 to 27 and reflected by the eyeball) from the eyeball of the user.

The eye proximity sensing sensor 50 is constituted by a photodiode or the like capable of being driven with power lower than the line of sight detection sensor 30. In the infrared LEDs 18, 19, 22 to 27 for line of sight detection, the infrared LED 22 also serves as the infrared LED for eye proximity sensing. That is, the infrared LED 22 is used for both the line of sight detection and the eye proximity sensing. The infrared LED 22 emits light to the user, and the eye proximity sensing sensor 50 receives the diffused reflected light (diffused reflected light emitted from the infrared LED 22 and diffused/reflected by the user) from the user.

Here, suppose a case in which light is emitted to the eyeball of the user who looks into the finder through at least any one of the infrared LEDs 18, 19, 22 to 27. In this case, as indicated by an optical path 31a in FIG. 4B, an optical image of the eyeball (eyeball image) to which the light was emitted passes through the eyepiece window 17, the G3 lens 15, the G2 lens 14, the G1 lens 13 and enters into the second optical-path division prism 10 from a second surface 10a of the second optical-path division prism 10. On a first surface 10b of the second optical-path division prism, a dichroic film which reflects the infrared light is formed, and as indicated by a reflection optical path 31b, the eyeball image having entered into the second optical-path division prism 10 is reflected by the first surface 10b to the side of the second surface 10a. Then, as indicated by an image-forming optical path 31c, the reflected eyeball image is fully reflected by the second surface 10a, goes out of a third surface 10c of the second optical-path division prism 10 to outside of the second optical-path division prism 10, passes through the diaphragm 28, and forms an image on the line of sight detection sensor 30 by the line of sight image forming lens 29. In the line of sight detection, together with the eyeball image as above, a cornea reflected image formed by the light emitted from the infrared LED and regular-reflected by the cornea is used.

Figure 5:
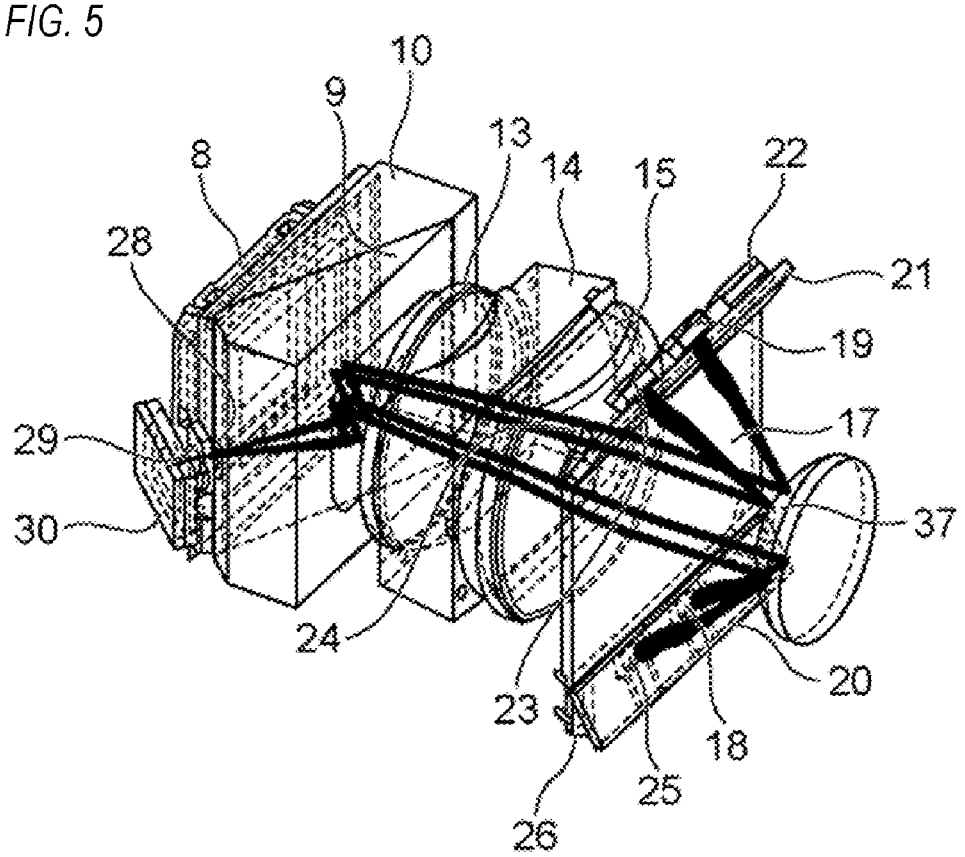
FIG. 5 is a diagram illustrating an optical path of light emitted from an infrared LED according to this embodiment.

FIG. 5 illustrates an example of the optical path from regular reflection of the light emitted from the infrared LEDs 18, 19, 23, 25 for close-range illumination by the cornea 37 of the eyeball to reception by the line of sight detection sensor 30.

<Explanation of Line of Sight Detection Operation>

Figure 6:
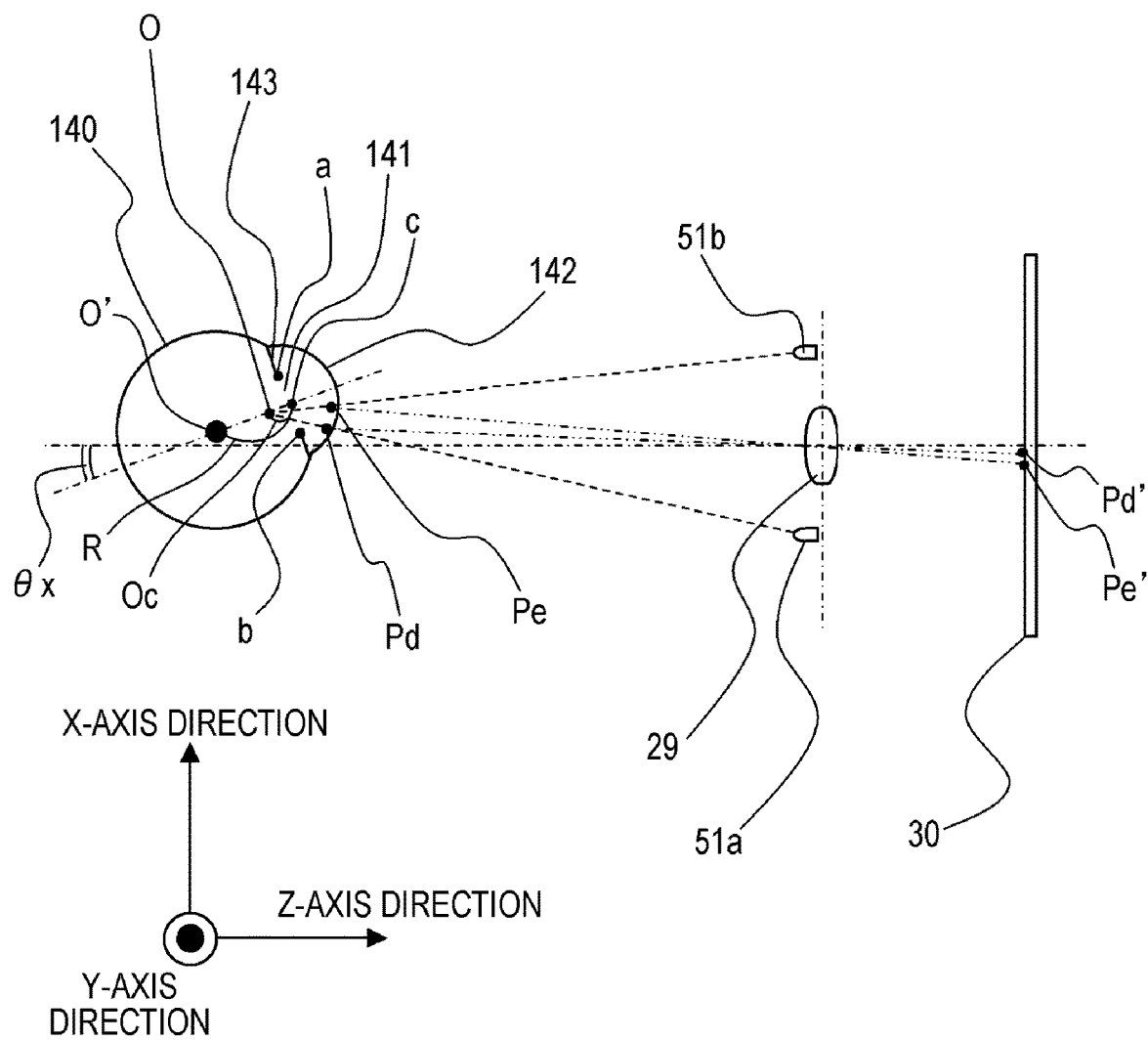
FIG. 6 is a diagram for explaining a principle of a sight-line detecting method according to this embodiment.

The line of sight detecting method will be described by using FIGS. 6, 7A, 7B, 8. Here, an example using two (infrared LEDs 51a, 51b in FIG. 6) in the infrared LEDs 18, 19, 22 to 27 will be described. FIG. 6 is a diagram for explaining a principle of the line of sight detecting method and a schematic diagram of an optical system for performing the line of sight detection. As shown in FIG. 6, the infrared LEDs 51a, 51b emit the infrared light to an eyeball 140 of the user. A part of the infrared light emitted from the infrared LEDs 51a, 51b and reflected by the eyeball 140 forms an image in the vicinity of the line of sight detection sensor 30 by the line of sight image forming lens 29. In FIG. 6, in order to facilitate understanding of the principle of the line of sight detecting method, positions of the infrared LEDs 51a, 51b, the line of sight image forming lens 29, and the line of sight detection sensor 30 are adjusted.

Figure 7A:
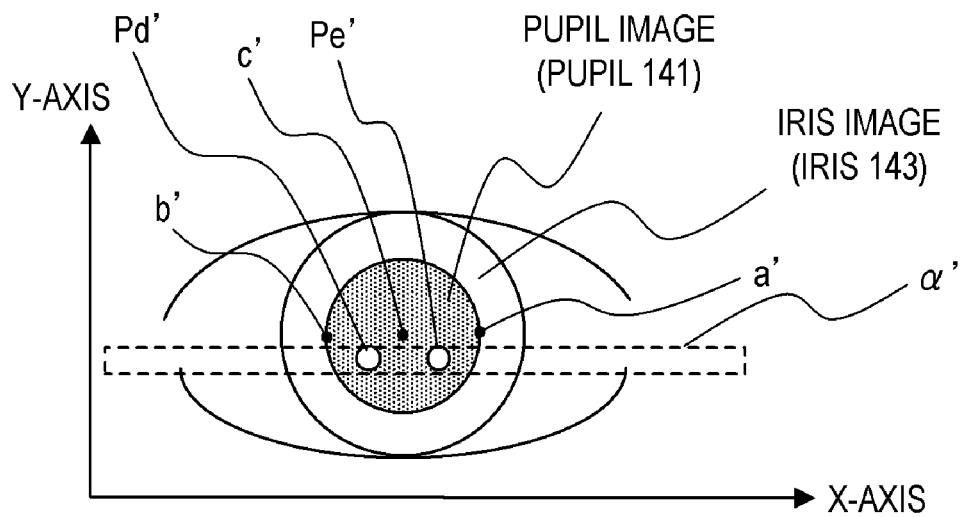
FIG. 7A is a diagram illustrating an eye image according to this embodiment.
Figure 7B:
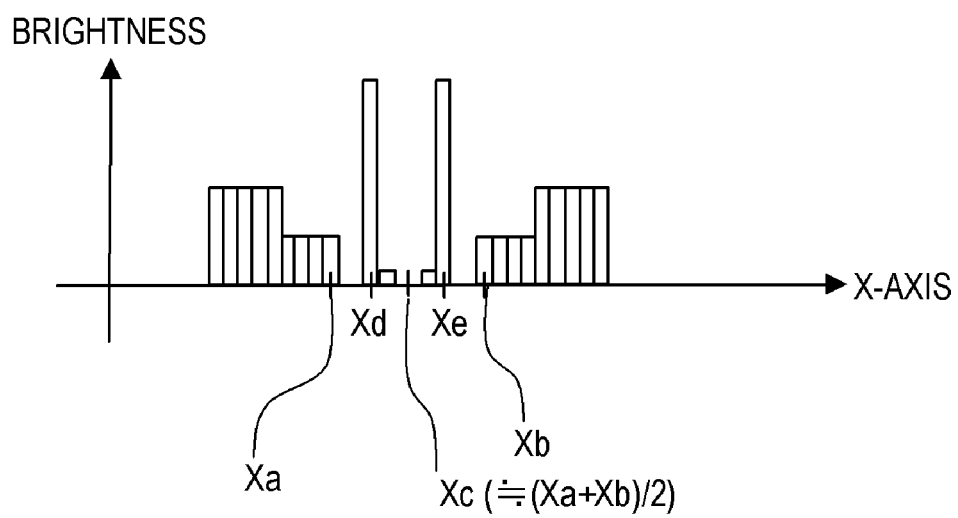
FIG. 7B is a diagram illustrating brightness distribution of an eye image.

FIG. 7A is a schematic diagram of the eye image (eyeball image projected to the line of sight detection sensor 30) picked up by the line of sight detection sensor 30, and FIG. 7B is a diagram illustrating output intensity of the line of sight detection sensor 30 (a CCD, for example). FIG. 8 illustrates a schematic flowchart of the line of sight detection operation.

When the line of sight detection operation is started, at Step S801 in FIG. 8, the infrared LEDs 51a, 51b emit the infrared light with light-emission intensity E2 for line of sight detection toward the eyeball 140 of the user in accordance with an instruction from the light-source driving unit 205. The eyeball image of the user illuminated by the infrared light is formed on the line of sight detection sensor 30 through the line of sight image forming lens 29 (light receiving lens) and is photoelectrically converted by the line of sight detection sensor 30. As a result, an electric signal capable of being processed of the eye image is obtained.

At Step S802, the line of sight detection unit 201 (line of sight detection circuit) sends the eye image (eye image signal; electric signal of the eye image) obtained from the line of sight detection sensor 30 to the CPU 3.

At Step S803, the CPU 3 acquires coordinates of points corresponding to cornea reflected images Pd, Pe of the infrared LEDs 51a, 51b and a pupil center c from the eye image acquired at Step S802.

The infrared light emitted from the infrared LEDs 51a, 51b illuminates a cornea 142 of the user's eyeball 140. At this time, the cornea reflected images Pd, Pe formed by a part of the infrared light reflected on the surface of the cornea 142 are collected by the line of sight image forming lens 29, form images on the line of sight detection sensor 30, and become cornea reflected images Pd', Pe' in the eye image. Similarly, light from end portions a, b of the pupil 141 also forms images on the line of sight detection sensor 30 and becomes pupil end images a', b' in the eye image.

FIG. 7B illustrates brightness information (brightness distribution) of a region a' in the eye image in FIG. 7A. In FIG. 7B, with a horizontal direction of the eye image as the X-axis direction and a perpendicular direction as the Y-axis direction, the brightness distribution in the X-axis direction is illustrated. In this embodiment, the coordinates in the X-axis direction (horizontal direction) of the cornea reflected images Pd', Pe' are supposed to be Xd, Xe, and the coordinates in the X-axis direction of the pupil end images a', b' are supposed to be Xa, Xb. As shown in FIG. 7B, the brightness at an extremely high level is obtained at the coordinates Xd, Xe of the cornea reflected images Pd', Pe'. In a region from the coordinate Xa to the coordinate Xb, which corresponds to the region of the pupil 141 (region of the pupil image obtained by image formation of the light from the pupil 141 on the line of sight detection sensor 30), the brightness at an extremely low level is obtained except the coordinates Xd, Xe. And in a region of an iris 143 outside the pupil 141 (region of an iris image outside the pupil image obtained by image formation of the light from the iris 143), the brightness in the middle of the aforementioned two types of the brightness is obtained. Specifically, the brightness in the middle of the aforementioned two types of the brightness is obtained in a region where the X coordinate (coordinate in the X-axis direction) is smaller than the coordinate Xa and a region where the X coordinate is larger than the coordinate Xb.

From the brightness distribution as shown in FIG. 7B, the X coordinates Xd, Xe of the cornea reflected images Pd', Pe' and the X coordinates Xa, Xb of the pupil end images a', b' can be obtained. Specifically, the coordinate with the extremely high brightness can be obtained as the coordinates of the cornea reflected images Pd', Pe', and the coordinate with the extremely low brightness can be obtained as the coordinate of the pupil end images a', b'. Moreover, when a rotation angle θx of the optical axis of the eyeball 140 with respect to the optical axis of the line of sight image forming lens 29 is small, a coordinate Xc of a pupil center image c' (center of the pupil image) obtained by image formation of the light from the pupil center c on the line of sight detection sensor 30 can be expressed as Xc≈(Xa+Xb)/2. That is, the coordinate Xc of the pupil center image c' can be calculated from the X coordinates Xa, Xb of the pupil end images a', b'. As described above, the coordinates of the cornea reflected images Pd', Pe' and the coordinates of the pupil center image c' can be estimated.

At Step S804, the CPU 3 calculates an image-forming magnification β of the eyeball image. The image-forming magnification β is a magnification determined by a position of the eyeball 140 with respect to the line of sight image forming lens 29 and can be acquired by using a function of an interval (Xd−Xe) of the cornea reflected images Pd', Pe'.

At Step S805, the CPU 3 calculates a rotation angle of the optical axis of the eyeball 140 with respect to the optical axis of the line of sight image forming lens 29. An X-coordinate of a middle point of the cornea reflected image Pd and the cornea reflected image Pe and an X-coordinate of a curvature center O of the cornea 142 substantially match each other. Thus, supposing a standard distance from the curvature center O of the cornea 142 to a center c of the pupil 141 is Oc, the rotation angle θx of the eyeball 140 in a Z-X plane (plane perpendicular to the Y-axis) can be calculated by the following formula 1. A rotation angle θy of the eyeball 140 in a Z-Y plane (plane perpendicular to the X-axis) can be also calculated by a method similar to the calculating method of the rotation angle θx.

$$\beta \times Oc \times \mathrm{SIN}\ \theta x \approx \{(Xd+Xe)/2\}-Xc \qquad \text{(Formula 1)}$$

At Step S806, the CPU 3 acquires (estimates) a sight point (position where the line of sight is targeted; position seen by the user) of the user in the image for visual recognition displayed on the display panel 6 by using the rotation angles θx, θy calculated at Step S805. If the coordinates (Hx, Hy) of the sight point are coordinates corresponding to the pupil center c, the coordinates (Hx, Hy) of the sight point can be calculated by the following formulas 2, 3.

$$Hx = m \times (Ax \times \theta x + Bx) \qquad \text{(Formula 2)}$$

$$Hy = m \times (Ay \times \theta y + By) \qquad \text{(Formula 3)}$$

It is assumed that the parameter m in the formulas 2, 3 is a constant determined by the configuration of the finder optical system (line of sight image forming lens 29 and the like) of the camera 1, is a conversion coefficient for converting the rotation angles θx, θy to coordinates corresponding to the pupil center c in the image for visual recognition, is determined in advance, and is stored in the memory unit 4. It is assumed that the parameters Ax, Bx, Ay, By are line of sight correction parameters for correcting individual differences of the line of sight, are acquired by performing publicly-known calibration work and stored in the memory unit 4 before the line of sight detection operation is started.

At Step S807, the CPU 3 stores the coordinates (Hx, Hy) of the sight point in the memory unit 4 and finishes the line of sight detection operation.

The method for detecting the line of sight is not limited to the aforementioned method. The number of infrared LEDs used for the line of sight detection may be larger or smaller than 2, and the line of sight detection is performed by using one or more infrared LEDs including the infrared LED 22 used for both the line of sight detection and the eye proximity sensing. The number of the infrared LEDs used for both the line of sight detection and the eye proximity sensing may be also larger or smaller than 2. All the infrared LEDs used for the line of sight detection may be used also for the eye proximity sensing.

<Explanation of Operation of Camera 1 Including Eye Proximity Sensing>

Figure 9:
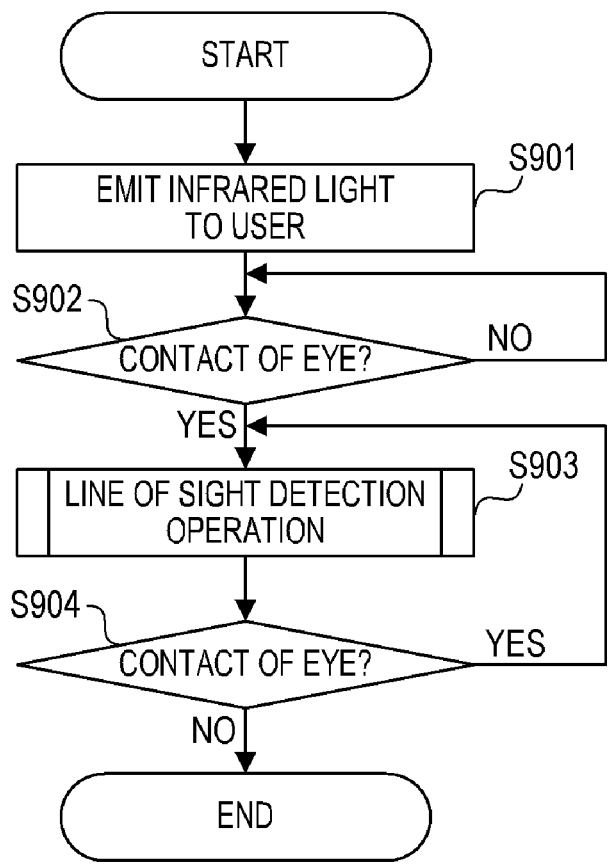
FIG. 9 is a flowchart of an operation including ocular sensing according to this embodiment.

FIG. 9 is a schematic flowchart of an operation of the camera 1 including the eye proximity sensing.

At Step S901 in FIG. 9, the infrared LED 22 is lighted with light-emission intensity E1 for the eye proximity sensing in accordance with the instruction from the light-source driving unit 205. At this time, the infrared LEDs 18, 19, 23 to 27 are preferably lighted off from the viewpoint of reduction in power consumption but may be lighted on. The light-emission intensity E1 for the eye proximity sensing and the light-emission intensity E2 for the line of sight detection may be the same or may be different. In this embodiment, it is assumed that the light-emission intensity E1 is set stronger than the light-emission intensity E2. The infrared light from the infrared LED 22 is emitted to the user, and the diffused reflected light from the user is received by the eye proximity sensing sensor 50.

At Step S902, the CPU 3 determines whether a reflected light amount received by the eye proximity sensing sensor 50, that is, a light receiving amount (light receiving intensity; light receiving brightness) of the eye proximity sensing sensor 50 exceeds a determination threshold value Th1 or not. The determination threshold value Th1 is stored in the memory unit 4 in advance. When the light receiving amount exceeds the determination threshold value Th1, it is determined that the user has contacted the eye with the eyepiece (finder; portion of the eye hole 12), and the processing proceeds to Step S903. On the other hand, if the light receiving amount does not exceed the determination threshold value Th1, it is determined that the user has not contacted the eye with the eyepiece, the processing returns to Step S902, and the processing at Step S902 is repeated until the light receiving amount exceeds the determination threshold value Th1.

At Step S903, the line of sight detection operation as described in FIG. 8 is performed. At this time, in accordance with the instruction from the light-source driving unit 205, the light-emission intensity of the infrared LED 22 is controlled to the light-emission intensity E2 for the line of sight detection from the light-emission intensity E1 for the eye proximity sensing. At least any one of the infrared LEDs 18, 19, 23 to 27 may be lighted on. As described above, in this embodiment, the light-emission intensity E1 is stronger than the light-emission intensity E2. That is, the light-emission intensity of the infrared LED 22 is weakened after the contact of the eye is sensed.

At Step S904, the CPU 3 determines whether the light receiving amount (light receiving intensity; light receiving brightness) of the eye proximity sensing sensor 50 exceeds a determination threshold value Th2 or not. The determination threshold value Th2 is stored in the memory unit 4 in advance. The determination threshold values Th1, Th2 are determined on the basis of the light-emission intensity of the infrared LED 22, and since the light-emission intensity E2 is weaker than the light-emission intensity E1 in this embodiment, the determination threshold value Th2 is set smaller than the determination threshold value Th1. That is, the determination threshold value is reduced after the contact of the eye is sensed. If the light receiving amount exceeds the determination threshold value Th2, it is determined that the user has contacted the eye with the eyepiece (finder; portion of the eye hole 12), and the processing proceeds to Step S903. On the other hand, if the light receiving amount does not exceed the determination threshold value Th2, it is determined that the user has separated the eye from the eyepiece (eye separation), and the operation in FIG. 9 is finished. Alternatively, the processing returns to Step S901.

As described above, according to this embodiment, at least a part of one or more light sources is used for both the eye proximity sensing and the line of sight detection. Specifically, the infrared LED 22 in the infrared LEDs 18, 19, 22 to 27 for the line of sight detection serves also as the infrared LED for the eye proximity sensing. As a result, as compared with the configuration in which the light source for the line of sight detection and the light source for the eye proximity sensing are provided separately, the eye proximity sensing function and the line of sight detection function can be realized with a smaller light source. As a result, complexity of the configuration or a size increase of the device can be suppressed, and the electronic device which realizes the eye proximity sensing function and the line of sight detection function with small power consumption can be provided with a low cost.

Since the two-dimensional eyeball image is used in the line of sight detection, a solid image pickup element such as a CCD and a CMOS needs to be used as the line of sight detection sensor 30. On the other hand, in the eye proximity sensing, it is only necessary whether a light amount of the reflected light from the user has reached a predetermined amount or not can be determined and thus, a sensor which can be driven with low power such as a photodiode can be used as the eye proximity sensing sensor 50. In this embodiment, by using the sensor, as the eye proximity sensing sensor 50, which can be driven with the power lower than that of the line of sight detection sensor 30, the power consumption of the electronic device is further reduced.

The number, disposition, type of the infrared LEDs (light sources) are not particularly limited, but in this embodiment, by providing the infrared LED illuminating a close range and the infrared LED illuminating a long range, highly accurate line of sight detection is enabled in both states where the eyeball is close to and far from the eyepiece. Moreover, by providing a plurality of the infrared LEDs, the line of sight can be detected more reliably. Specifically, even if the light from any of the infrared LEDs is shielded by an eyelid or the like and is not emitted to the cornea, the line of sight can be detected by irradiating the cornea with the other infrared LEDs.

As described above, the diffused light from the user is used for the eye proximity sensing, while the regular reflected light from the cornea is used for the line of sight detection. Thus, the light source for the eye proximity sensing can be disposed with a high degree of freedom, but the disposition of the light source for the line of sight detection has many limitations. As an example, consider a case in which the light source for the line of sight detection is disposed on a right side of the ocular optical system 16 (positive direction side of the X-axis perpendicular to the optical axis of the ocular optical system 16) or on the left side (negative direction side of the X-axis). In this case, since the ocular optical system 16 has a shape longer in the X-axis direction than in the Y-axis direction, the light source is disposed at a position far away from the optical axis of the ocular optical system 16. Then, the regular reflected light on the outer side of the eyeball is collected on the line of sight detection sensor 30, but the light from the light source is easily vignetted (shielded) by the eyelid. Particularly, the vignetting can occur easily at photographing at a vertical position when the user rotates the camera 1 around the Z-axis by 90° and looks into the ocular optical system 16. By narrowing the ocular optical system 16 in the X-axis direction and by bringing the light source closer to the ocular optical system 16, the vignetting can be suppressed, but comfortability of the user is impaired. In this embodiment, by disposing the infrared LED 22 used for both the eye proximity sensing and the line of sight detection on an upper side (positive direction side of the Y-axis perpendicular to the optical axis of the ocular optical system 16) of the ocular optical system 16, the comfortability of the user is not impaired and occurrence of the vignetting is suppressed. Note that the similar effect is obtained even if the infrared LED 22 is disposed on a lower side (negative direction side of the Y-axis) of the ocular optical system 16. The same applies also to the infrared LEDs 18, 19, 23 to 27.

A period of time during which the line of sight detection sensor 30 receives light is not particularly limited, but the line of sight detection sensor 30 preferably starts the light receiving (operation) after the eye proximity sensing. As a result, the line of sight detection sensor 30 is not driven until the contact of the eye is sensed and thus, power consumption of the electronic device can be further reduced.

The light-emission intensities of the infrared LEDs 18, 19, 22 to 27 are not particularly limited, but in this embodiment, the light-emission intensities of the infrared LEDs 18, 19, 22 to 27 can be controlled. Thus, the infrared LEDs 18, 19, 22 to 27 can be lighted on with the light-emission intensities suitable for each of the line of sight detection and the eye proximity sensing. Specifically, the light-emission intensity of the infrared LED 22 used for both the line of sight detection and the eye proximity sensing is controlled so that it becomes weaker after the eye proximity sensing. As a result, the contact of the eye can be sensed even in a state where the eye is located farther away at the eye proximity sensing, and the line of sight detection can be performed with smaller power consumption at the line of sight detection. The light-emission intensity of the infrared LED 22 may be controlled so as to become stronger after the eye proximity sensing. In that way, the eye proximity sensing can be performed with smaller power consumption at the eye proximity sensing, and since the intensity of the cornea reflected image is strengthened at the line of sight detection, the line of sight detection more resistant to disturbance can be enabled. It is preferable that the light-emission intensity for the eye proximity sensing and the light-emission intensity for the line of sight detection are set in accordance with a performance required for the electronic device. The light-emission intensities of the infrared LEDs 18, 19, 23 to 27 may be controlled as appropriate. For example, the infrared LEDs 18, 19, 23 to 27 are lighted off at the eye proximity sensing (before the line of sight detection) or the light-emission intensities of the infrared LEDs 18, 19, 23 to 27 may be controlled to the light-emission intensity equal to that of the infrared LED 22 at the line of sight detection (after the eye proximity sensing).

The determination threshold value is not particularly limited, but in this embodiment, the determination threshold value is controlled in accordance with the control of the light-emission intensity of the light source (infrared LED). Specifically, since the light-emission intensity of the infrared LED 22 is weakened after the eye proximity sensing, the determination threshold value is also reduced after the eye proximity sensing in conformity with that. As a result, the eye proximity sensing can be conducted suitably (with high accuracy) either before and after the eye proximity sensing. The light-emission intensity of the infrared LED 22 may be strengthened after the eye proximity sensing, and in that case, it is preferable that the determination threshold value is also raised after the eye proximity sensing.

The aforementioned embodiments (including the variation) are only examples, and configurations obtained by deforming or changing the aforementioned configuration as appropriate within a scope of the gist of the present invention are also included in the present invention. The configurations obtained by combining the aforementioned configurations as appropriate are also included in the present invention.

According to the present disclosure, electronic device which realizes the ocular-sensing function and the sight-line detection function with small power consumption can be provided with a low cost.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device which is capable of performing eye proximity sensing to sense contact of an eye with an eyepiece and line of sight detection to detect a line of sight, comprising:
   an eye proximity sensing sensor configured to receive light for the eye proximity sensing;
   a line of sight detection sensor configured to receive light for the line of sight detection, the line of sight detection sensor being separate from the eye proximity sensing sensor;
   one or more light sources including a light source used for both the eye proximity sensing and the line of sight detection; and
   a processor configured to control light-emission intensity of at least the light source used for the both, wherein
   in the eye proximity sensing, a state where a light receiving amount of the eye proximity sensing sensor exceeds a threshold value is sensed as the contact of the eye; and
   the processor controls the light-emission intensity after the contact of the eye is sensed by the eye proximity sensing, and controls the threshold value in accordance with the control of the light-emission intensity.

2. The electronic device according to claim 1, wherein
the eye proximity sensing sensor is capable of being driven by power lower than power of the line of sight detection sensor.

3. The electronic device according to claim 1, wherein
the one or more light sources are a plurality of light sources.

4. The electronic device according to claim 1, wherein
an optical system provided on the eyepiece has a shape longer in a second direction perpendicular to an optical axis of the optical system as compared with a first direction perpendicular to the optical axis; and
at least the light source used for the both is disposed on a side of the first direction from the optical system.

5. The electronic device according to claim 1, wherein
the line of sight detection sensor starts light reception after the contact of the eye is sensed by the eye proximity sensing.

* * * * *